United States Patent [19]

Taylor

[11] 3,989,420  
[45] Nov. 2, 1976

[54] CONCRETE PUMPING APPARATUS

[75] Inventor: Engene Taylor, Kenosha, Wis.

[73] Assignee: J. I. Case Company, Racine, Wis.

[22] Filed: Sept. 15, 1975

[21] Appl. No.: 613,334

Related U.S. Application Data

[63] Continuation-in-part of Ser. No. 470,069, May 15, 1974, abandoned, which is a continuation-in-part of Ser. No. 398,203, Sept. 17, 1973, abandoned.

[52] U.S. Cl. ............................... 417/517; 417/519; 417/900
[51] Int. Cl.² .................................... F04B 15/02
[58] Field of Search .......... 417/516, 517, 519, 531, 417/532, 900

[56] References Cited
UNITED STATES PATENTS

| | | | |
|---|---|---|---|
| 3,298,322 | 1/1967 | Sherrod | 417/900 |
| 3,298,332 | 1/1967 | Sherrod | 417/900 |
| 3,331,332 | 7/1967 | Wennberg | 417/900 |
| 3,663,129 | 5/1972 | Antush | 417/900 |
| 3,682,575 | 8/1972 | Guddal | 417/900 |
| 3,726,614 | 4/1973 | Schellenberg | 417/900 |
| 3,741,691 | 6/1973 | Schwing | 417/900 |
| 3,920,357 | 11/1975 | Taylor | 417/900 |

*Primary Examiner*—William L. Freeh
*Assistant Examiner*—G. P. LaPointe
*Attorney, Agent, or Firm*—Dressler, Goldsmith, Clement, Gordon & Shore, Ltd.

[57] ABSTRACT

This disclosure relates to a pumping apparatus that includes a hopper for receiving concrete with a delivery line extending from the hopper and a cylinder cooperating with the hopper to deliver concrete to the delivery line. A valve has an outlet end connected to the delivery line and is pivoted within the hopper between two positions to alternately connect the cylinder to the delivery line and to the hopper for delivering concrete to the delivery line and then withdrawing concrete from the hopper for subsequent delivery. An adjustable wear plate is located adjacent the inlet end of the valve so that continuous contacting engagement can be maintained between adjacent surfaces of the valve and the plate. The valve also has rigidifying means associated therewith and is supported on the hopper in a manner to prevent distortion during movement thereof.

15 Claims, 6 Drawing Figures

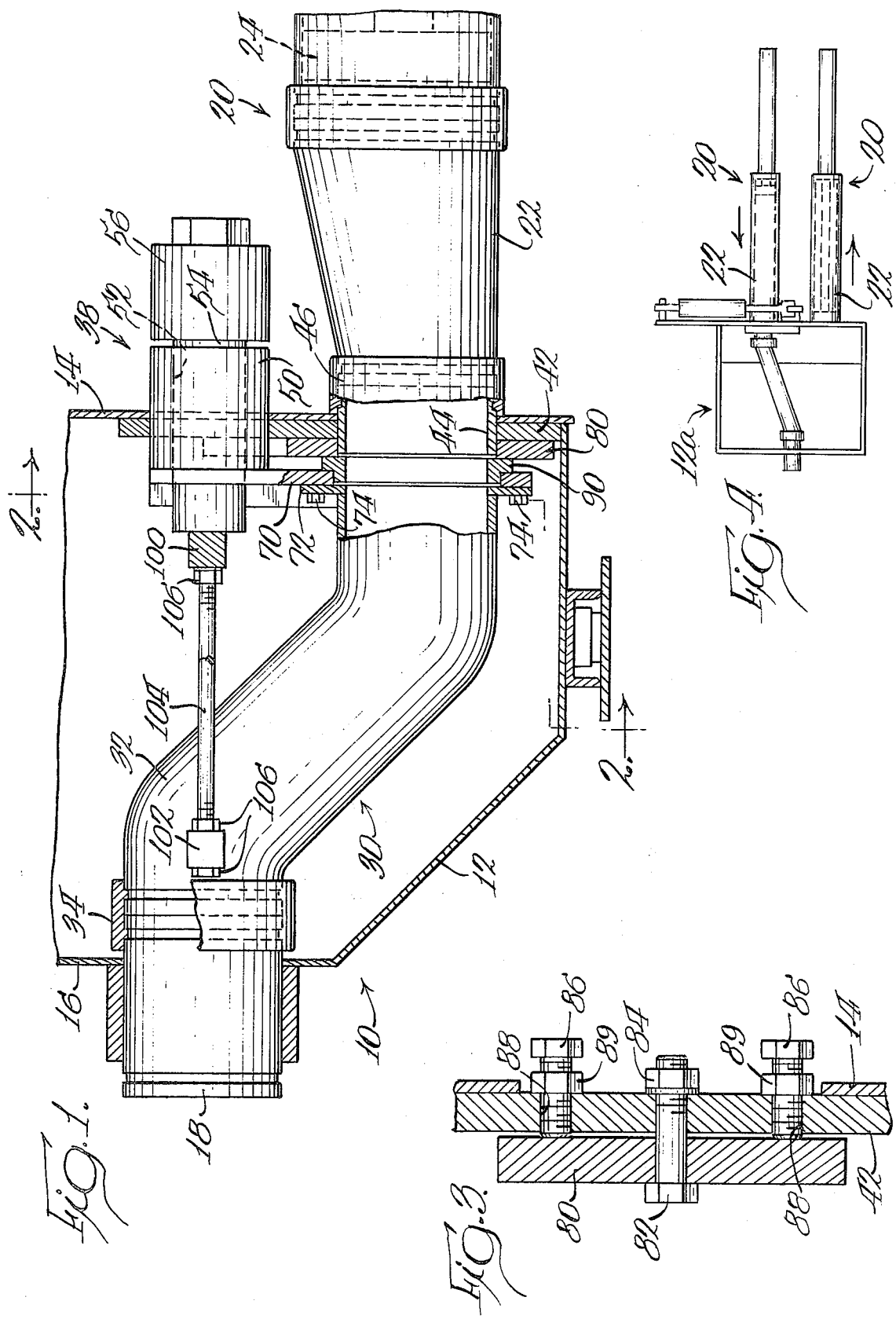

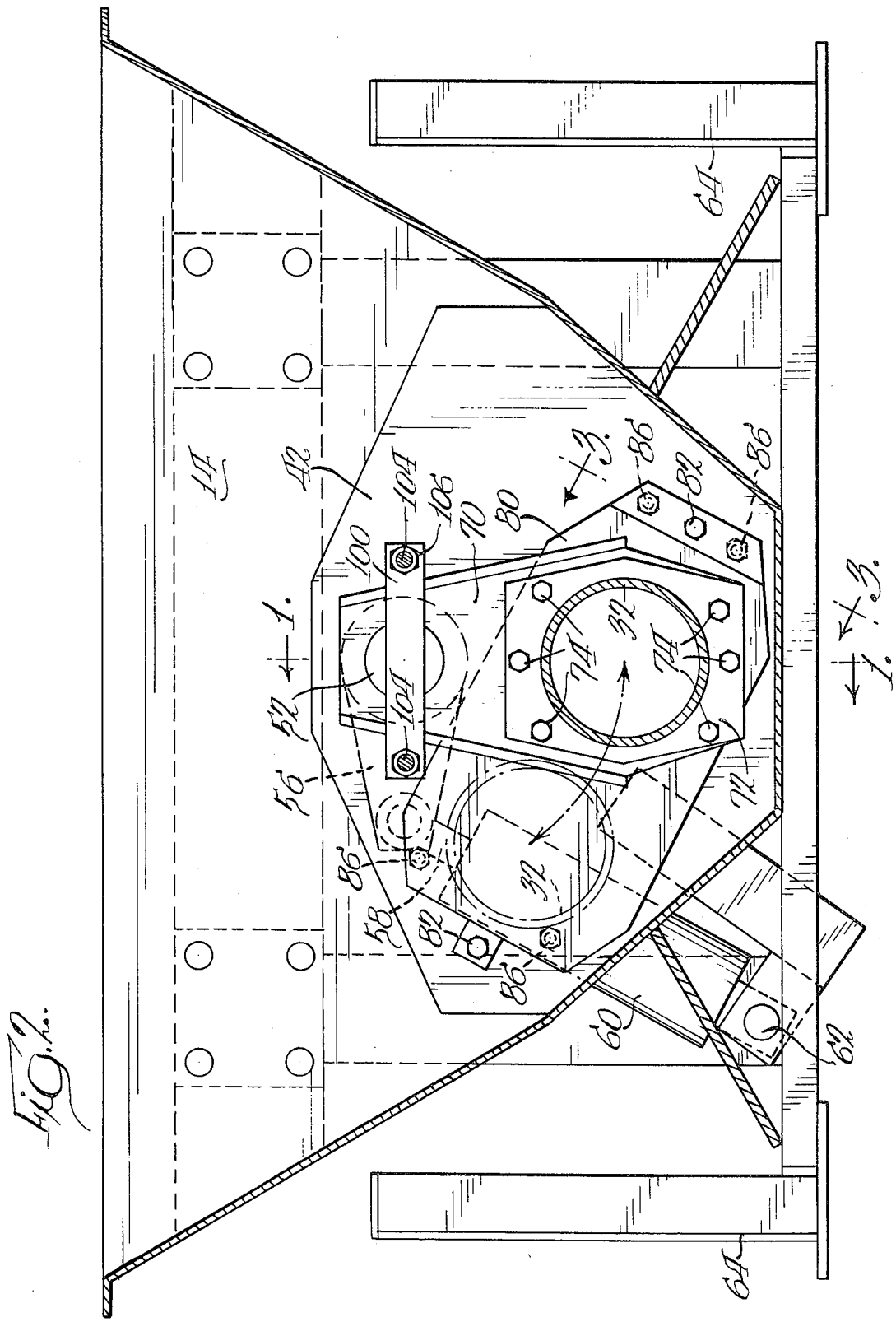

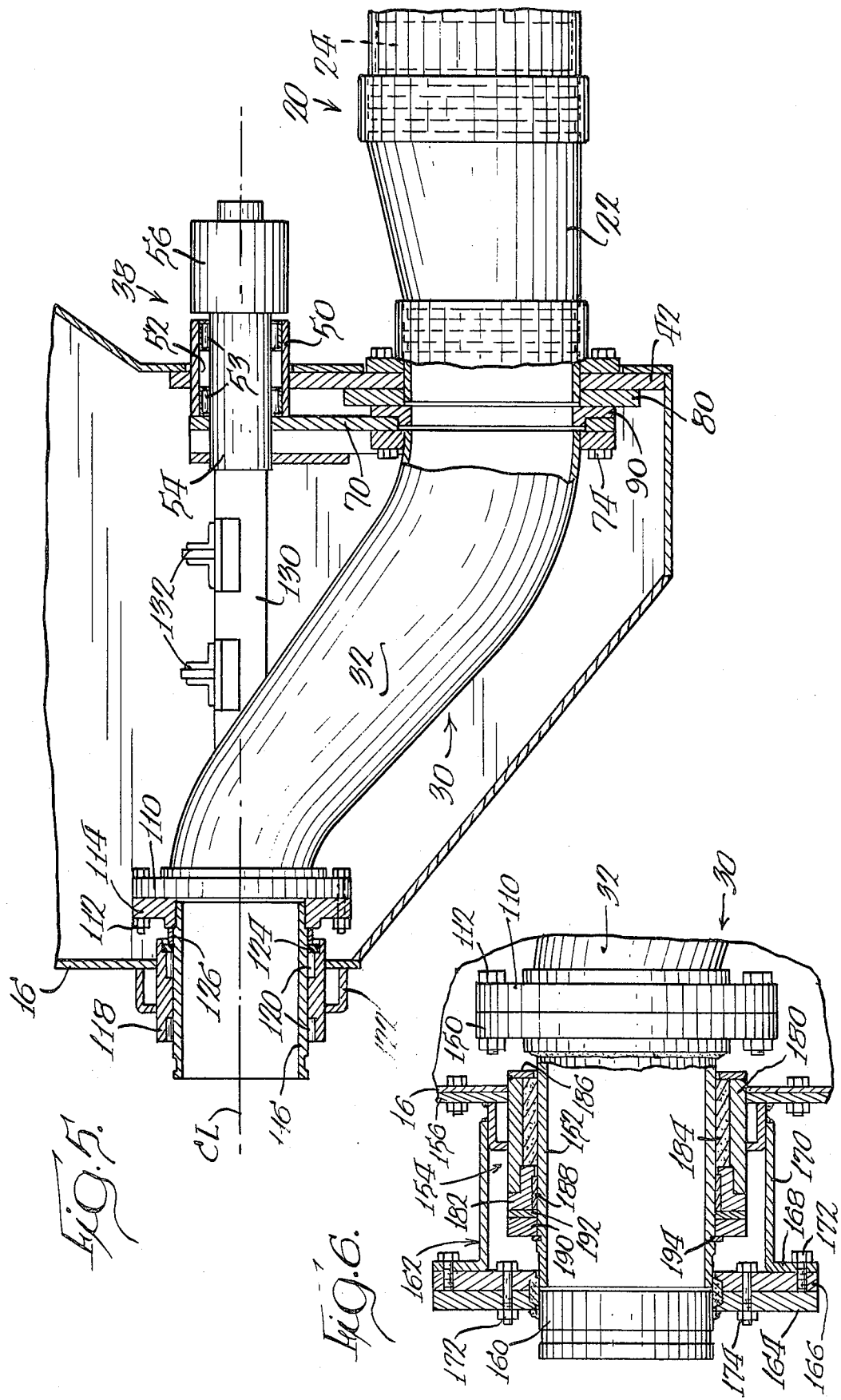

3,989,420

CONCRETE PUMPING APPARATUS

REFERENCE TO RELATED APPLICATIONS

This application is a continuation-in-part of application Ser. No. 470,069, filed May 15, 1974, now abandoned, which in turn is a continuation-in-part of application Ser. No. 398,203, filed, Sept. 17, 1973, now abandoned.

BACKGROUND OF THE INVENTION

The present invention relates generally to pumps and more particularly to pumping apparatus for pumping fluent materials, such as concrete.

With the recent emphasis on the use of concrete for high-rise building structures, various pumps have been proposed for transporting a plastic mass, such as concrete, through some type of portable pumping unit.

One type of pumping unit that has been used for this purpose includes a hopper for receiving concrete from a source with a delivery line leading from the hopper. A pair of cylinders with pistons reciprocated therein communicate with the hopper and a shuttle valve is located between the cylinders and the delivery line. The pistons for the respective cylinders are driven in opposite directions and one cylinder is connected to the delivery line while the other cylinder is in communication with the hopper. With such an arrangement, concrete is being withdrawn from the hopper into one cylinder while the concrete in the second cylinder is being forced out into the delivery line.

Summary of the Invention

The present invention relates to an improvement in concrete units of the above type which considerably reduces the initial cost of the unit and also reduces the amount of maintenance required during use. The pumping unit consists of one or two pumping cylinders that cooperate with a hopper which has a shuttle valve located therein and connected to a delivery line. The shuttle valve is movable between two positions that respectively allow concrete to be drawn into the pumping cylinders and then delivered to the delivery line through the valve.

A wear plate is positioned inside the hopper and is adjustable towards and away from the inlet end of the valve which is associated with the cylinder so that the wear plate can be maintained in continuous contacting engagement with the end of the valve. The adjustable means may be in the form of screws and bolts that interconnect the hopper and the wear plate and the inlet end of the valve preferably has a wear ring associated therewith to provide a flat surface adjacent the end of the valve.

According to another aspect of the invention, the shuttle valve is constructed as a rigid reinforced unit which is rotatably supported about a fixed axis defined by bearings secured to opposed walls of the hopper so that distortion of the tube that defines the shuttle valve is maintained at a minimum.

BRIEF DESCRIPTION OF THE SEVERAL VIEWS OF THE DRAWINGS

FIG. 1 is a vertical sectional view of the concrete pumping apparatus as viewed generally along line 1—1 of FIG. 2;

FIG. 2 is a transverse sectional view as viewed along line 2—2 of FIG. 1;

FIG. 3 is an enlarged fragmentary sectional view as viewed along line 3—3 of FIG. 2;

FIG. 4 is a plan view of a slightly modified pumping apparatus;

FIG. 5 is a view similar to FIG. 1 showing details of a specific type of support structure for the movable valve; and FIG. 6 is an enlarged fragmentary view of a modified form of support for the movable valve.

DETAILED DESCRIPTION

While this invention is susceptible of embodiment in many different forms, there is shown in the drawings and will herein be described in detail preferred embodiments of the invention with the understanding that the present disclosure is to be considered as an exemplfication of the principles of the invention and is not intended to limit the invention to the embodiments illustrated.

FIG. 1 of the drawings generally discloses a concrete pumping apparatus designated by the reference numeral 10. Pumping apparatus 10 consists of a concrete receiving hopper 12 that has front and rear walls 14 and 16 with a coupling element 18 located in the rear wall which defines an entrance for a delivery line (not shown) for the concrete pumping apparatus. Concrete pumping apparatus 10 has a pump 20 communicating with hopper 12 through the front wall 14. Concrete pump 20 consists of a cylinder 22 having a piston 24 reciprocated therein and the piston may be reciprocated between retracted and extended positions through a hydraulic ram (not shown).

Concrete pumping apparatus 10 also includes a shuttle valve 30 that is located in the hopper and is adapted to selectively connect cylinder 22 to delivery line 18. Shuttle valve 30 includes a tube 32 that has an outlet end connected to delivery line 18 through a sleeve 34. Sleeve 34 provides a coupling between one end of tube 32 and delivery line 18 while still allowing for rotating movement of the tube 32 about the axis of stationary delivery line 18.

Tube 32 is reciprocated between first and second positions, respectively shown in solid and phantom lines in FIG. 2, through suitable drive means that will now be described. Drive means 38 is located adjacent front wall 14 and, for this purpose, front wall 14 has a rigidifying plate 42 secured thereto through suitable means (not shown). Rididifying plate 42 has a first sleeve 44 extending through front wall 14 with the open end of cylinder 22 connected thereto through a coupling 46.

Plate 42 also has a bearing housing or sleeve 50 secured thereto, as by welding. This sleeve extends through front wall 14 and is positioned to define an opening 52 that has its axis aligned with the axis of delivery line 18. A shaft 54 extends through opening 52 and has an arm 56 secured thereto and extending radially therefrom. A piston rod 58 is reciprocated in a hydraulic cylinder 60 and has its free end connected to the arm 56 while the opposite end of cylinder 60 is pivoted on a pivot pin 62 supported on a frame structure 64 that also supports the hopper 12. The inner end of shaft 52 is connected to the opposite end of tube 32 that defines the shuttle valve 30 through a further arm 70 and this connection may be accomplished by a flange welded to the inlet end of tube 32 and secured to arm 70 through bolts 74.

Concrete pumping apparatus 10 further includes an adjustable wear plate 80 that is located between the inlet end of tube 32 and the adjacent rigidifying plate 42 connected to the front wall 14 of hopper 12. Plate 80 is adapted to be adjusted relative to hopper 12 through a simple adjustment means that is shown most clearly in FIGS. 2 and 3. The adjustable means consists of a pair of bolts 82 extending through wear plate 80 and rigidifying plate 42 that forms part of hopper 12. A nut 84 is threaded on the end of each of the bolts 82.

The adjustable means includes a pair of screws 86 located on opposite sides of each of the bolts 82 and received in threaded openings 88 located in rigidifying plate 42. The free ends or outer ends of screws 86 engage the adjacent surface of wear plate 80 and the screws are held in adjusted position by lock nuts 89.

To complete the concrete pumping apparatus of the present invention, the free end of tube 32 preferably has a wear ring 90 secured thereto as by being frictionally received into an opening in the arm 70.

The adjustable wear plate can readily be maintained in continuous contacting engagement with an adjacent surface of the wear ring 90 by the manipulation of screws 86 and nuts 84. For example, if a clearance is developed between adjacent surfaces of wear ring 90 and wear plate 80, it is only necessary to loosen the two nuts 84 on screws 82, loosen the four lock nuts 89 and then turn the four screws 86 sufficiently to move the adjacent surfaces of wear ring 90 and wear plate 80 into engagement with each other. All of this can be accomplished with a single tool in a matter of minutes and thereby can substantially increase the service life of the unit without any major maintenance or repair. Furthermore, the adjustable wear plate and wear ring can readily be replaced at a minimum cost which considerably decreases the maintenance cost for the unit.

While the operation of the so far described unit will readily be appreciated from the above description, a brief summary will now be made. With the unit in the position shown in FIGS. 1 and 2 of the drawings, the piston 24 is in its fully extended position wherein all the concrete from cylinder 22 has been forced through delivery line 18. At this time, the piston rod 58 is extended in cylinder 60 to move the end of tube 32 associated with the front end of hopper 14 to the second position shown in phantom line in FIG. 2. At the same time, the direction of travel of piston 24 is reversed so that concrete may be withdrawn from hopper 12 into cylinder 22. When the piston reaches its fully retracted position, the valve 32 will be moved to the solid-line position shown in FIG. 2 so that the cylinder is placed in communication with delivery tube 18 to allow the concrete in the cylinder 22 to be forced through valve 32 into delivery line 18.

With the pumping apparatus described above, there may be sufficient distortion of the unit during the synchronized movement of piston rod 58 and piston 24 to produce some distortion in shuttle valve 30 and drive means 38 so that binding forces may be developed in the unit. In other instances, the forces developed by pumping cylinder 24 will distort the hopper and valve to cause the valve to separate from the open end of the cylinder and allow the concrete to return to the hopper. To overcome these problems, the drive means 38 is connected directly to the outlet end of tube 32 through rigidifying means and the tube is supported in the hopper in a specific manner.

Referring to FIGS. 1 and 2, the rigidifying means includes a bar 100 secured to the inner end of shaft 52 and a pair of lugs 102 (only one being shown in FIG. 1) secured to the opposite sides of tube 32, as by welding. Lugs 102 have openings extending therethrough for receiving one end of rods 104, the opposite ends of which extend through openings in the bar 100. A pair of nuts 106 are located on opposite sides of each of the lugs 102 as well as the bar 100 so that adjustment of the respective nuts on the threaded ends of the rods 104 will securely interconnect the outlet end of valve 32 with the drive means 38. The adjustable rods 104 thereby provide a rigid connection between the drive means 38 and the outlet end of tube or valve 32.

FIG. 5 shows a specific form of reinforcing mechanism for the shuttle valve and its support on the hopper. In this embodiment all reference numerals for the same parts are used to identify the parts that are the same as described above.

In this embodiment, tube 32 has a flange 110 secured to one end thereof as by welding. Flange 110 is bolted by bolts 112 to a second flange 114 which in turn is secured to a sleeve 116, as by welding. Sleeve 116 and flange 114 define a rigid extension for tube 32 and sleeve 116 is rotatably supported in a bearing support or housing 118 by bearings 120. Bearing support 118 is fixed with respect to wall 16 by a brace 122 welded at selected locations to wall 16 and bearing housing 118. Sleeve 116 may be considered part of a delivery line (not shown) or a part of tube 32. To prevent concrete from entering bearings 120 a ring seal 124 preferably surrounds sleeve 116 and is held in position by a spacer 126. The open end of the second bearing may likewise be sealed by suitable means.

In the embodiment shown in FIG. 5, the rigidifying means for shuttle valve 30 consists of a bar 130 that is located on center line CL and has opposite ends respectively welded to the inner end of shaft 54 and the outer surface of tube 32. FIG. 5 also shows bearings 53 interposed between bearing sleeve or housing 50 and shaft 54, part of drive means 38. The rigidifying bar may have brackets 132 secured thereto for supporting agitating means of the type disclosed and claimed in application Ser. No. 450,617, filed Mar. 13, 1974.

In the embodiment of FIG. 5, reinforcing plate 42 has an apertured flange secured thereto for connecting cylinder 22 to hopper 12. Also, as is true in the embodiment shown in FIG. 1, the inlet end of tube 32 is offset from the axis or center line CL and is connected to shaft 54 by arm 70.

The embodiment of the invention shown in FIG. 5 results in minimum if any binding of shuttle valve 30 with respect to hopper 12 because the entire mechanism is supported on bearings 53 and 120. Also deflection due to aggregate concrete pressures during movement of shuttle valve 30 is kept at a minimum because the mechanism is substantially an integral unit.

A further modified form of support for valve 30 is disclosed in FIG. 6 wherein the delivery line is held stationary with respect to the hopper and the valve is connected to the delivery line through a fluid connection to accommodate relative movement between the valve and the delivery line.

As shown in FIG. 6, valve 30, more sppecifically tube 32, as in the embodiment shown in FIG. 5, has a flange 110 secured thereto. Flange 110 is secured by bolts 112 to a second flange 150 that is welded to the end of a sleeve 152. Sleeve 152 is rotatably supported in a bearing housing 154 supported on front wall 16 of hopper 10 by a support plate 156. In this embodiment, a further sleeve 160 is fixed with respect to hopper 16 and is spaced from wall 16 by a bracket 162 which surrounds bearing housing 154. Bracket 162 includes a first plate 164 that has sleeve 160 welded thereto and a second plate 166 secured to a flange 168 of bracket portion 170 through bolts 172. The open end of sleeve 152 is located in close proximity to the adjacent end of sleeve 160 and is axially aligned therewith. The spacing between the adjacent ends of sleeves 152 and 160 is sealed by a surrounding Vitaulic gasket 172 which is supported in recesses defined in flanges 164 and 166. The two flanges are also held together by bolts 174.

The bearing housing 154 supporting sleeve 152 consists of a hub 180 extending through plate 156 and rear wall 16 with a bearing support 182 supported on the outer end of hub 180. A suitable sealing element 184 is interposed between sleeve 152 and hub 180 with a ring seal 184 engaging the end of sealing element 184. A bearing 188 is interposed between bearing support 182 and sleeve 152. Sleeve 152 also has a ring 190 fixed to the periphery thereof by screws (not shown) and a thrust bearing 192 is located between ring 190 and bearing support 182. Axial movement of ring 190 may be prevented by a snap ring 194 received in an annular recess on the periphery of sleeve 152. As in the previous embodiment described in connection with FIG. 5, the remainder of the valve support is identical to that shown in the previous embodiments.

The particular support for the outlet end of valve 30 illustrated in FIG. 6 has been found to be capable of withstanding large forces that are developed between the delivery line inlet 160 and the cylinder 22 without substantial distortion. It will be appreciated that in the embodiment shown in FIG. 6, the resistance to the forces developed between the concrete and the delivery line is absorbed through bracket 162 and the fluid seal produced between sleeves 152 and 160 will allow relative movement between the valve 30 and the delivery line.

The same general arrangement described in all of the above embodiments can also be incorporated into a concrete pumping apparatus wherein two pumping units are utilized so that concrete can be continuously supplied to delivery line 18. For example, FIG. 4 shows a hopper 12a that has a pair of pumps 20 associated with the front wall thereof. The pumps 20 each have cylinders 22 connected to openings in the front wall of hopper 12a so that the respective cylinders would be in communication with the inlet end of valve 32 in the respective positions for the valve shown in FIG. 2. With this type of pumping apparatus, the first and second positions for the shuttle valve 32 would be preferably located equally on opposite sides of a vertical plane extending through the axis of shaft 52 and the adjustable wear plate 80 would be repositioned accordingly.

The internal structure of the hopper with the drive mechanism and the shuttle valve would be substantially identical to that described in connection with the single pump unit in FIG. 1 or the pumping unit shown in FIGS. 5 and 6.

What is claimed is:
1. Concrete pumping apparatus comprising: a hopper for receiving concrete, a delivery line extending from said hopper, a cylinder having one end in communication with said hopper, said cylinder having a piston reciprocated therein, said piston being movable in one direction to withdraw concrete from said hopper into said cylinder and in an opposite direction to force concrete from said cylinder, a valve in said hopper, said valve having one open end connected to said delivery line and an opposite open end, drive means for reciprocating said valve between two positions, said valve connecting said cylinder to said delivery line in one position and placing said cylinder in communication with said hopper in the other position, said hopper having bearing housings supported by opposed walls thereof with said bearing housings having bearings supported therein and defining axially aligned openings, said valve including a rigid tube having a flange at said open end, and a sleeve rotatably supported in an opening defined by one of said bearing housings, said sleeve having a second flange secured to said first flange.

2. Concrete pumping apparatus as defined in claim 1, in which said drive means includes a shaft rotatably supported in the opening of the other bearing housing and rigidifying means between said shaft and said one end of said tube.

3. Concrete pumping apparatus as defined in claim 2, in which said tube has said opposite open end offset from the axis of the openings in said bearing housings and an arm connecting said opposite end of said shaft to said tube.

4. Concrete pumping apparatus as defined in claim 3, further including a wear plate supported in said hopper adjacent said cylinder, and adjustable means cooperating with said hopper and said wear plate for maintaining said wear plate in contacting engagement with said opposite end of said valve.

5. Concrete pumping apparatus as defined in claim 4, in which said adjustable means includes bolts extending through one wall having said bearing housing supporting said shaft, said bolts extending through said one wall and said wear plate for loosely retaining said wear plate, and screws threaded into openings in one of said one wall and said wear plate, said screws having free ends engaging an adjacent surface of the other of said one wall and said wear plate.

6. Concrete pumping apparatus as defined in claim 1, in which said delivery line is fixed to said hopper at a location spaced from the wall having said one of said bearing housing supported thereon and said sleeve has an open end in communication with said fixed delivery line and rotatable relative thereto.

7. Concrete pumping apparatus as defined in claim 6, in which said one of said bearing housing extends beyond said wall and has an end adjacent said delivery line and in which said delivery line is supported on said hopper by a bracket surrounding said one of said bearing housings.

8. Concrete pumping apparatus comprising: a hopper for receiving concrete, a delivery line extending from said hopper, a cylinder having one end in communication with said hopper, said cylinder having a piston reciprocated therein, said piston being movable in one direction to withdraw concrete from said hopper into said cylinder and in an opposite direction to force concrete from said cylinder, a valve in said hopper, said valve having one open end connected to said delivery line and an opposite open end, drive means for reciprocating said valve between two positions, said valve connecting said cylinder to said delivery line in one position and placing said cylinder in communication with said hopper in the other position, a wear plate supported in said hopper adjacent said cylinder, and adjustable means cooperating with said hopper and said wear plate for maintaining said plate in contacting engagement with said opposite open end of said valve, said adjustable means including bolts extending through said hopper and said wear plate for loosely retaining said wear plate on said hopper, and screws threaded into openings in one of said hopper and said wear plate, said screws having free ends engaging an adjacent surface of the other of said hopper and said wear plate.

9. Concrete pumping apparatus as defined in claim 8, further including a wear ring surrounding said opposite open end of said valve, said wear ring having a surface in contacting engagement with an adjacent surface on said wear plate.

10. Concrete pumping apparatus as defined in claim 8, further including a second cylinder having one end in communication with said hopper, said second cylinder having a piston reciprocated therein and having said one end in communication with said opposite open end of said valve when said valve is in the other position.

11. Concrete pumping apparatus as defined in claim 8, in which said hopper has a bracket extending from a wall with said delivery line fixed to a free end of said bracket, a first bearing housing extending from said wall within said bracket and a sleeve connected to said open end of said valve, said sleeve having an open end in communication with said delivery line and rotatably supported in said bearing housing.

12. Concrete pumping apparatus as defined in claim 11, in which said hopper has a second bearing housing axially aligned with said first bearing housing and said drive means includes a shaft rotatably supported in said second bearing housing with rigidifying means between said shaft and said valve, and in which said opposite open end of said valve is axially offset with respect to said bearing housings with an arm connecting said shaft to said opposite open end of said valve.

13. Concrete pumping apparatus comprising a hopper for receiving concrete, a cylinder having an open end extending through one wall of said hopper, a delivery line fixed to a second wall opposite said one wall, a bearing housing secured to said second wall and aligned with said delivery line, a valve in said hopper, said valve having an extension rotatably supported in said bearing housing and aligned with said delivery line, sealing means between said extension and delivery line, said valve having an open end adjacent said cylinder, and drive means for reciprocating said valve between two positions, said valve connecting said cylinder to said delivery line in one position and placing said cylinder in communication with said hopper in the other position.

14. Concrete pumping apparatus as defined in claim 13, in which said one wall has a second bearing housing aligned with the bearing housing in said second wall and said drive means includes a shaft rotatably supported in said second bearing housing and in which said open end is offset from the axis for said bearing housing with an arm connecting said shaft to said valve.

15. Concrete pumping apparatus as defined in claim 14, further including rigidifying means between said shaft and said valve adjacent said extension.

* * * * *

UNITED STATES PATENT AND TRADEMARK OFFICE
CERTIFICATE OF CORRECTION

PATENT NO. : 3,989,420
DATED : November 2, 1976
INVENTOR(S) : Eugene D. Taylor

It is certified that error appears in the above-identified patent and that said Letters Patent are hereby corrected as shown below:

The inventor's name "Engene Taylor" should read --Eugene D. Taylor--.

Column 2, line 16, "exemplfication" should read --exemplification--.

Column 2, line 49, "Rididifying" should read --Rigidifying--.

Signed and Sealed this

Eleventh Day of January 1977

[SEAL]

Attest:

RUTH C. MASON
*Attesting Officer*

C. MARSHALL DANN
*Commissioner of Patents and Trademarks*